UNITED STATES PATENT OFFICE.

GEORGE BESTWICK, OF PATRICROFT, ENGLAND.

IMPROVED MEANS FOR PREVENTING RADIATION OF HEAT FROM BOILERS, PIPES, OR THE LIKE.

SPECIFICATION forming part of Letters Patent No. 648,339, dated April 24, 1900.

Application filed November 28, 1899. Serial No. 738,589. (No specimens.)

*To all whom it may concern:*

Be it known that I, GEORGE BESTWICK, a subject of the Queen of Great Britain, residing at Patricroft, in the county of Lancaster, England, have invented new and useful Improved Means for Preventing Radiation of Heat from Boilers, Pipes, or the Like, of which the following is a specification.

The improvement which forms the subject of this invention relates to means for preventing the radiation of heat from boilers, pipes, and the like.

According to this invention I produce a composition for the purposes to which I have above referred by a combination of the corozo-nut, that is obtained from the corozo-pippin after the rind and fruit have been removed therefrom, generally known as the "ivory-nut," or seed of a tropical American palm, with certain ingredients hereinafter named and in the manner described.

I steep the corozo-nut in a solution of chlorid of lime for several hours and then grind it into a powder. I add thereto cotton-seed and cork in a powdered form and flue-dust or carbon. I mix these ingredients in equal proportions with a liquid obtained from the star-fish or jelly-fish, thereby making it into a paste, which I pass through rolls and form a cloth or band of any required thickness. When said cloth or band is applied to steam or other pipes, it will prevent loss of heat and no vapor will arise.

I claim as my invention—

A composition for preventing radiation of heat from boilers pipes and the like that is obtained by a combination of the corozo or ivory nut with cotton-seed, cork, carbon and a liquid obtained from the star-fish or jelly-fish in the manner substantially as hereinbefore described.

In testimony whereof I have signed my name to this specification in the presence of two subscribing witnesses.

GEORGE BESTWICK.

Witnesses:
JNO. HUGHES,
J. ERNEST HUGHES.